Nov. 20, 1951 R. C. FERGASON 2,575,620
DETACHABLY MOUNTED CORN HARVESTER
Filed March 4, 1946 7 Sheets-Sheet 3

Inventor
Rector C. Fergason
by K.S. Wyman
Attorney

Nov. 20, 1951  R. C. FERGASON  2,575,620
DETACHABLY MOUNTED CORN HARVESTER
Filed March 4, 1946  7 Sheets-Sheet 6

Fig. 14

Inventor
Rector C. Fergason
by K. A. Wyman
Attorney

Patented Nov. 20, 1951

2,575,620

UNITED STATES PATENT OFFICE 2,575,620

DETACHABLY MOUNTED CORN HARVESTER

Rector C. Fergason, La Porte, Ind., assignor to Allis-Chalmers Manufacturing Company, Milwaukee, Wis., a corporation of Delaware Application March 4, 1946, Serial No. 651,737

9 Claims. (Cl. 56—18)

This invention relates generally to corn harvesters and other agricultural implements designed to be mounted on a self-propelled draft means, such as a tractor, to extend longitudinally of the tractor generally forward of its rear wheel supporting axle structure, and more particularly to the construction and mounting of a unitary implement structure or assembly of the type including a first section which is disposed generally forward of the rear axle structure of the tractor and a second section which extends rearward from the first section and beneath the rear axle structure.

In addition to having first and second sections coordinated in general as above set forth, some types of implements, for example corn harvesters, have a first section comprising crop picking parts which must be inclined upward and rearward relative to the direction of travel in order to obtain satisfactory operation, and a second section extending rearwardly from such first section and serving to convey the material from said first section to a point rearward of the rear axle structure of the tractor. The satisfactory operation of such harvesters necessitates the crop picking portion having an angle of inclination such that it attains a height approaching the ground clearance afforded by a tractor having a relatively low rear axle structure. Consequently, it has heretofore been considered impractical to provide a unitary implement structure having sections coordinated as above described and to detachably mount such an implement on a tractor having a rear axle structure affording less ground clearance than the height of the harvester.

Therefore, an object of the present invention is to provide an improved tractor-agricultural implement combination including a unitary implement structure of the type above mentioned wherein various parts of the implement are constructed and combined in a manner permitting the implement to be readily attached to and removed from the tractor with a minimum separation of implement parts, and in a manner minimizing the number of detachable supporting connections required.

Another object of the present invention is to provide an improved tractor-agricultural implement combination comprising a detachably mounted compact unitary harvester structure or assembly including a crop picking section mounted to extend upward and rearward of the tractor to a height approaching the ground clearance afforded by the rear axle structure and including a picked crop conveying section which extends generally rearward from the crop picking section and beneath the rear axle structure.

Still another object of this invention is to provide an improved tractor-agricultural implement combination wherein a unitary implement structure or assembly is disposed mainly alongside the tractor generally forward of the rear axle structure thereof with a rear section of the implement extending beneath such axle structure, and wherein the tractor and implement are provided with detachably connectable implement supporting parts permitting the implement to be readily attached to and removed from the tractor with a minimum of time, effort and skill.

Still another object of this invention is to provide an improved tractor-implement combination wherein the implement comprises a detachably mounted unitary structure or assembly including a first section having a part thereof which extends above the underside of the tractor rear axle when the implement structure is detached from the tractor and rests on the ground and having a second section which extends rearward from the first section and beneath the tractor rear axle, and wherein the unitary implement structure is detachably mounted on the tractor by means comprising releasably connected parts permitting the tractor to be readily driven clear of the unitary implement structure by releasing such parts and moving the tractor rearward relative to the unitary structure until the rear wheel remote from the first section can be swung past the rear end of the second section and by then pivoting the tractor on the other rear wheel in a direction to swing the front end of the tractor away from the first section, and permitting the tractor to be positioned for ready attachment of the implement thereto by reversing the above outlined procedure.

Still another object of the present invention is to provide an improved tractor-implement combination comprising a corn harvester embodying parts constructed and combined to provide a compact unitary structure or assembly adapted to be detachably mounted alongside a tractor having a relatively low rear axle structure with its ear picking section inclined upward and rearward at an effective picking angle and with a picked ear conveying section extending generally rearward from the picking portion and beneath the rear axle structure of the tractor.

Still another object of the present invention is to provide an improved tractor-implement combination comprising a corn harvester including ear picking and conveying parts constructed and combined in generally alined relation to provide a unitary structure which can be readily detachably mounted on a tractor in partially underslung relation with respect to its rear axle structure and wherein the rear end of the picking part attains a height approaching the ground clearance of the rear axle structure and the forward end of the conveying part is disposed in stepped-down relation with respect to the rear end of the picking part.

Still another object of the present invention is to provide an improved corn harvester comprising a unitary ear picking and conveying assembly which can be readily detachably mounted on a tractor or other suitable draft device to extend mainly forwardly of the rear axle structure of the tractor and which includes features of construction and/or combinations of elements affording a material reduction in the number of separately mounted subassemblies or structures.

And still another object of this invention is to provide an improved corn harvester comprising separate unitary power applying, trash removing and ear picking and conveying assemblies which can be readily attached to a tractor or other suitable draft device, in a manner materially simplifying the coordination and connection of the coacting parts of such assemblies.

The construction, mounting and operating of apparatus embodying the invention will become readily apparent as the disclosure progresses and particularly points out features, advantages and additional objects considered of special importance. And accordingly, the present invention may be considered as consisting of the various combinations of apparatus and elements constructed and/or correlated as is more fully set forth in the detailed description and in the appended claims, reference being had to the accompanying drawings illustrating an embodiment of the invention and in which:

Figure 14:
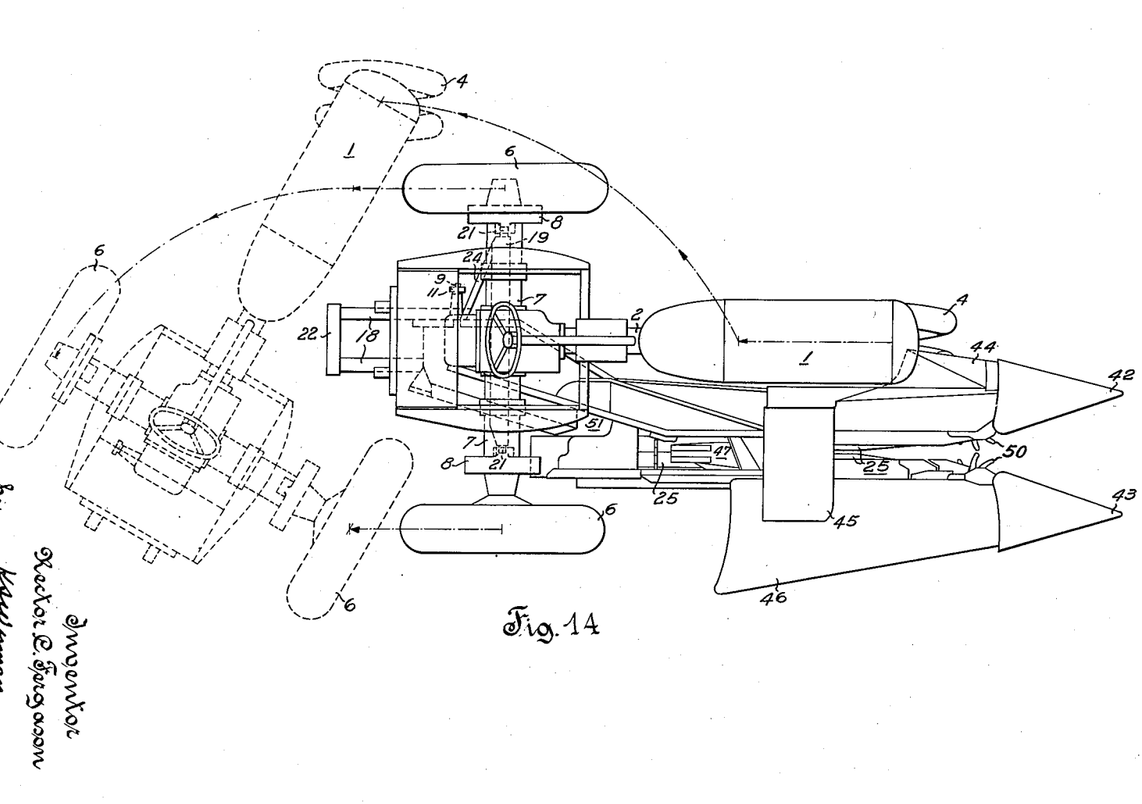
Fig. 14 is a view illustrating the manner in which a tractor is driven away from the unitary ear picking and conveying assembly shown in Fig. 9.

In the embodiment of the invention illustrated in the drawings, the tractor 1 is of conventional form and includes a frame structure 2 mounting an engine 3 provided with conventional control accessories (not shown). The tractor frame is supported on a pair of adjacent centrally disposed front dirigible elements or steering wheels 4 and on a pair of laterally spaced traction wheels 5 or ground engaging elements hereinafter called wheels carried by a rear axle structure. The rear axle is preferably a conventional drop type structure comprising an intermediate portion 7 enclosing a differential drive, driven from the engine through the usual transmission, and depending side portions 8 enclosing gearing connecting the differential drive with the axles of the traction wheels 6. The traction wheels 6 are preferably adjustable longitudinal of their respective axles in order to vary the width of tread. And in this connection it will be noted (see Figs. 4 and 14) that the right rear wheel is displaced a considerably greater distance from the center line of the tractor than is the left rear wheel in order to compensate for the side draft produced by the weight and crop or ground resistance of a side mounted harvester or implement. The rear portion of the tractor is provided with a power take-off shaft 9 mounting a power transmitting sprocket wheel or the like 11.

Figure 10:
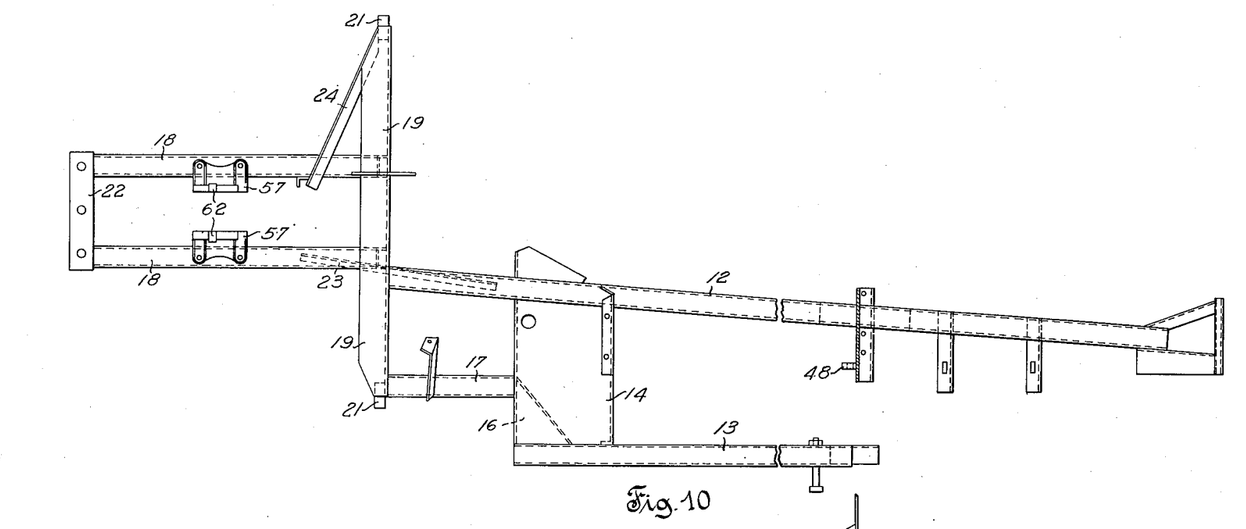
Fig. 10 is a plan view of the unitary frame structure for the ear picking and conveying assembly shown in Fig. 9.
Figure 11:
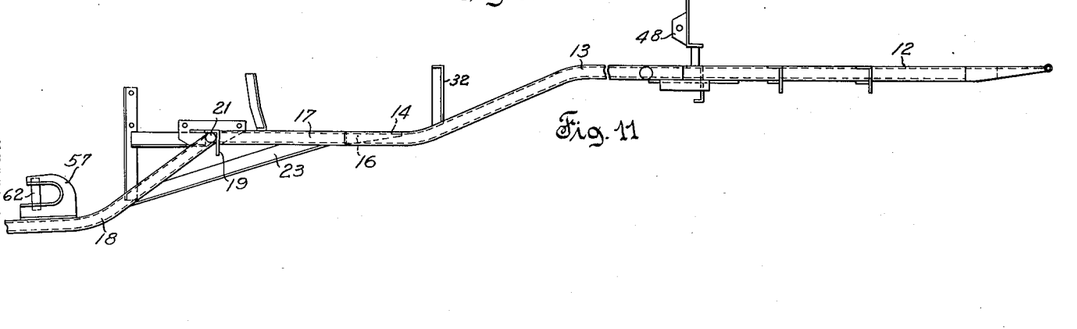
Fig. 11 is a partial side elevation of the structure shown in Fig. 10.

As illustrated, the tractor mounted unitary implement assembly is a one row corn harvester comprising ear picking and conveying means mounted on a unitary main frame structure including (see Figs. 10 and 11) a front or first portion formed by longitudinally extending inner and outer bars 12 and 13 suitable braced by cross connectors and gusset plates designated 14 and 16, respectively, and including a stepped-down and laterally offset rear or second portion formed by a longitudinally extending member 17 inwardly offset relative to the rear end of outer member 13, by the rear end of inner member 12, and by a pair of laterally spaced members 18 having upturned forward end portions interconnected with each other and with the rear ends of members 17 and 12 by a cross member 19 having its opposite ends provided with alined outwardly projecting pivot pins 21. Members 18 are further braced by a cross connector 22 and by an upwardly extending member 23 connecting the lower portion of the outer one of the members 18 with a rear end portion of inner member 12. The inner end of cross member 19 is further braced by a member 24 connecting same with inner member 18.

The ear picking and conveying sections mounted on the front portion of the unitary frame structure include a pair of conventional cooperative harvester rolls 25 and a conveying chain 26. Chain 26 is operatively mounted on a front sprocket 27 carried by the forward end of the frame at the inner side of the rolls, on a guide sprocket 28 carried by the frame at the inner side of the rear ends of the rolls, and on a driving sprocket 29 suitably mounted at the upper end of a vertical shaft 31 carried by the main frame in inwardly offset relation and somewhat beyond the rear or discharge end of the rolls 25. Guide sprocket 28 coacts with sprocket 27 to direct the active course of the chain over and along the harvester rolls. Rolls 25 are mounted in suitable bearings carried by a rear bearing bracket 32 adjacent the rear end of the rolls and by a forward bearing bracket 33. The rear end of the inner roll is flexibly connected with a short shaft 34 rotatably supported in a bracket mounted bearing 30 carried by the frame structure and which is in turn flexibly connected with a driven shaft 35. The outer roll is driven through a gear connection 36 with the inner roll. Each harvester roll (see Fig. 1) preferably includes a picker section 37 forwardly of bearing bracket 33, a primary trash removing section 38 immediately to the rear of picker section 37 and bearing bracket 33, a husking section 39 immediately to the rear of trash section 38, and if desired, another primary trash removing section 41 immediately to the rear of husking section 39.

The front portion of the unitary frame structure also mounts inner and outer gathering shields comprising point portions 42 and 43 and rear portions 44 and 46, respectively. The rear portions of the shields are preferably interconnected by a cross brace and throat forming member 45 and present opposed vertically extending rear wall portions coacting to form with the rolls 25 a trough 47 through which the picked ears and any pieces of stalk trash which may be present are conveyed rearwardly by the active course of chain 26. A fixed bracket 48 on an intermediate part of the front frame portion pivotally carries a link 49 having a hooked upper end 40 for effecting a supporting connection with a part 67 carried by an intermediate portion of tractor frame 2. In addition, the forward end of the front frame portion rotatably mounts a pair of laterally spaced stalk gathering spider wheels 50.

The ear conveying means mounted on the rear portion of the unitary frame structure includes a wall structure forming a trough 51 which is disposed in stepped-down extension forming relation with respect to the rear or discharge end of trough 47 and extends inward and rearward away therefrom to a point adjacent the upper end of outer rear frame member 18. And a conveying chain 52 is operatively mounted on a sprocket 53 fixed to the lower end of vertical shaft 31 and on a driving sprocket 54 mounted on a vertical shaft 55 carried by the rear frame portion at a point adjacent the discharge end of trough 51. The desired degree of chain tautness is obtained by suitably adjusting a guide member 56 associated with the inactive course of the chain. Sprockets 53 and 54 are so arranged that the active course of chain 52 passes through the lower or bottom portion of trough 51 in spaced relation with respect to the overlying rear end portion of the active course of chain 26. In this connection, it should be noted that shafts 35 and 114 constitute independent power receiving elements for the separate power actuable mechanisms, i. e., the rolls 25 and the conveying chains 26 and 52, mounted on the unitary main frame structure.

Figures 1, 2, 3:
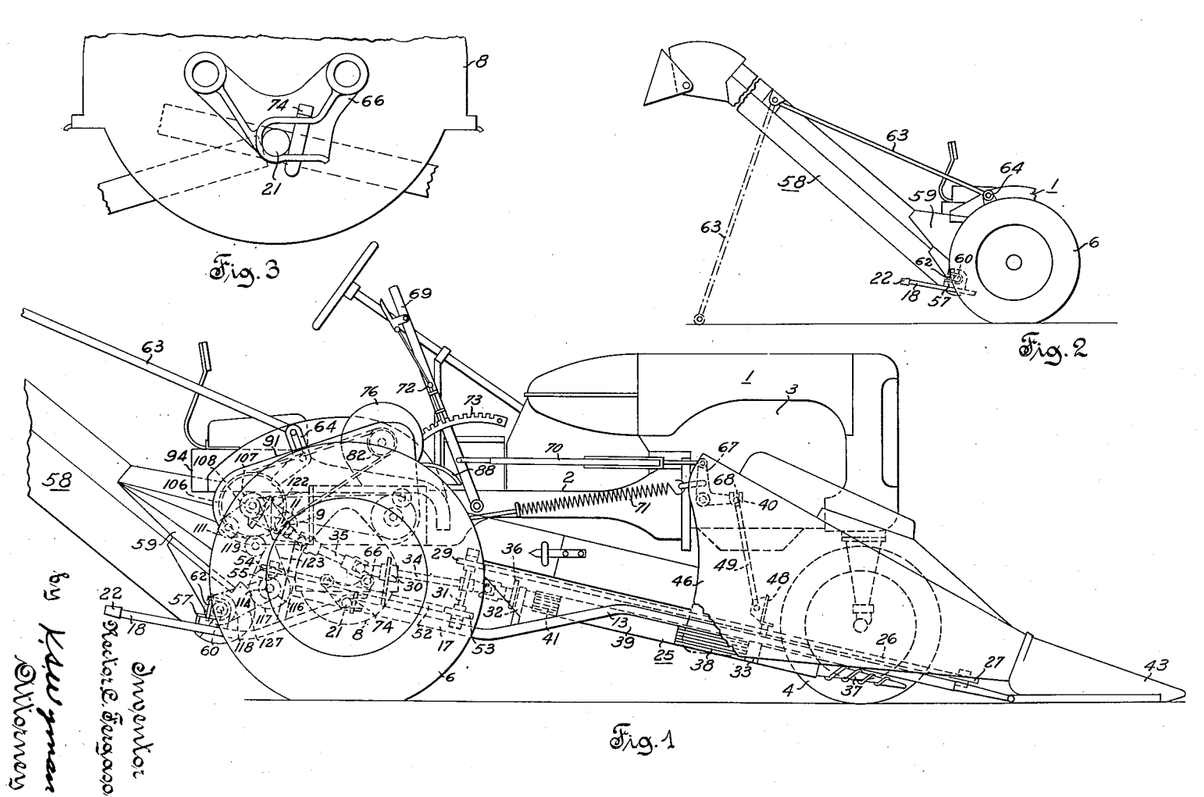
Fig. 1 is a side elevation of a tractor-harvester combination embodying features of the present invention with the rear portion of the ear elevating conveyor assembly broken away.
Fig. 2 is a complete view of the rear end of the combination shown in Fig. 1.
Fig. 3 is an enlarged side elevation of the axle mounted harvester supporting elements shown in dotted lines in Fig. 1.

The top side of rear frame members 18 fixedly mounts a pair of rearwardly opening laterally spaced and aligned pivot pin receiving brackets 57. And a conventional ear elevating conveyer 58 (see Figs. 1 and 2) includes a lower well or hopper portion 59 rotatably mounting a transverse conveyer shaft 60 which extends through and beyond the side walls of the well portion to provide oppositely projecting pivot pin portions supportingly disposed in brackets 57 and held therein by means of removable pins 62. The elevating conveyer is further supported by a pair of reach rods 63 pivotally detachably connecting its upper portion with a pair of laterally spaced and preferably adjustable brackets 64 carried by a rear portion of the tractor. When the elevating conveyer is mounted on the rear portions of the tractor and frame structure as indicated in Figs. 1 and 2, the well portion 59 thereof is positioned to receive material from the discharge end of trough 51.

The inner opposed sides of drop axle portions 8 are provided with alined forwardly opening pivot pin receiving brackets 66 and an intermediate side portion of tractor frame structure 2 mounts a pivoted bell crank lever 67 having a forwardly extending horizontal arm portion provided with an upwardly opening hook receiving recess 68. The other arm of lever 67 is pivotally connected with an intermediate portion of a lever 69 by means of a link structure 70. A spring 71 for counterbalancing the front portion of the unitary implement assembly connects the other or upper arm of lever 67 with a fixed portion of the tractor frame 2. Lever 69 is positioned within easy reach of the tractor operator and is provided with a releasable latch element 72 operatively associated with a serrated quadrant 73 for retaining this lever and thereby bell crank 67 in selected positions. And the unitary implement assembly, including the ear picking and conveying means, the gathering shields and other parts carried thereby, is detachably tractor mounted as a unit with its front section disposed generally along one side of the tractor and with its rear section disposed in underslung relation with respect to the rear axle structure 7 thereof by positioning the pivot pins 21 on frame cross member 19 in the brackets 66 on drop axle portion 8, by inserting securing pins 74 through alined holes in the forward end portions of these brackets, and by hooking the upper end 40 of link 49 in the recess 68 in the forwardly extending arm of bell crank lever 67. The coacting pins 21 and brackets 66 afford a pivotal support for the rear end of the unitary implement assembly and the forward end of this assembly can be readily raised or lowered as desired by suitably shifting the position of lever 69. In this connection, it will be noted that the essential parts of the ear picking and conveying means carried by the front portion of the unitary frame structure are disposed laterally within the tread of the right rear traction wheel in generally parallel relation with respect to the longitudinal axis of the tractor, and that the stepped-down and offset conveyor carried by the rear portion of the frame structure terminates in a rearwardly directed discharge approximately in line with the longitudinal axis of the tractor.

Figure 15:
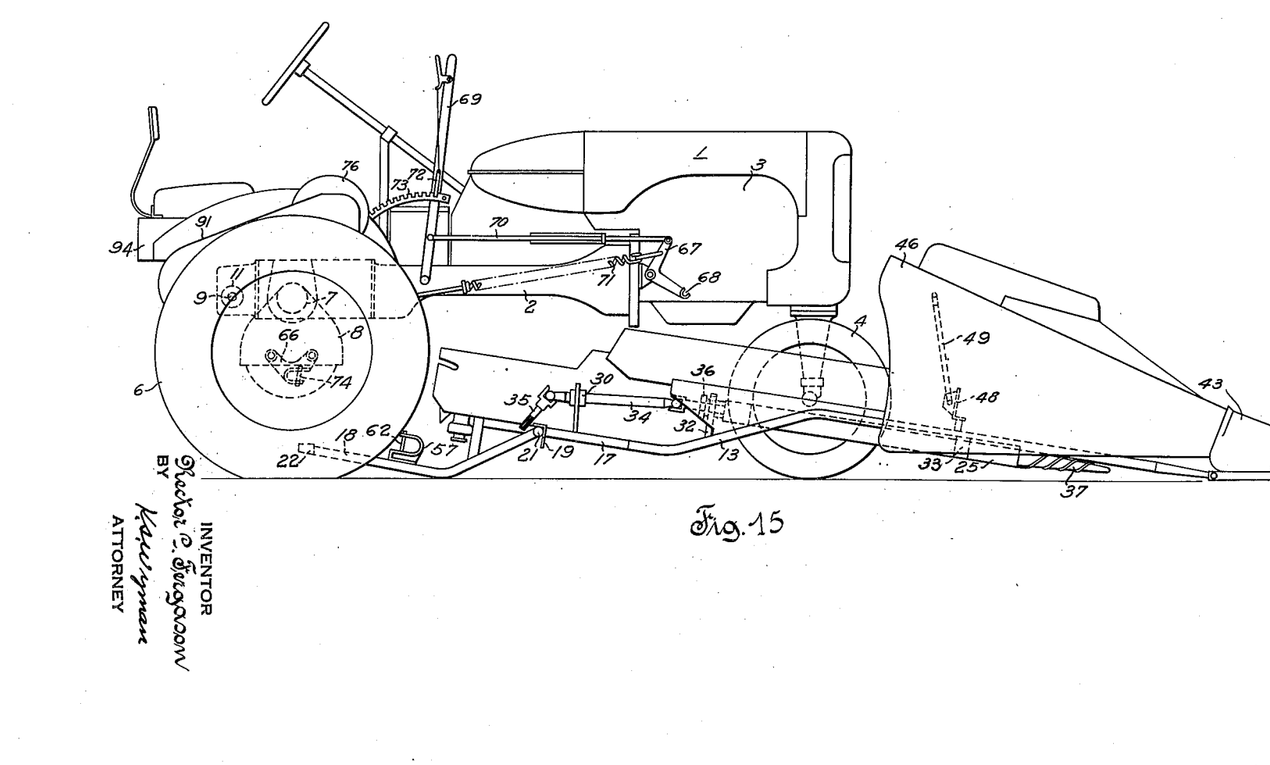
Fig. 15 is a side view of the tractor and of the ear picking and conveying assembly with the tractor backed straight away from the assembly a distance comparable to that indicated in Fig. 14.

Referring also to Fig. 15, it will be seen that when the unitary implement assembly comprising the main frame structure and the parts carried thereby is resting on the ground, the height of this unitary assembly, even with the gathering shields removed, is greater than the ground clearance afforded by the rear axle structure 7 and that therefore the tractor cannot be backed over this assembly for attachment thereto as is done with certain types of two row pickers. And it will also be noted that the inwardly offset rear end section of this assembly also prevents the tractor from being driven forwardly over the rear portion and alongside the front section thereof for attachment thereto. Moreover, even if the dimensions of the rear section of such an assembly would permit its being manually moved into a position for attachment to a tractor, it is entirely too large and heavy to be thus handled by one man without dismantling a number of the parts which in turn would require considerable time and effort.

Consequently, one of the outstanding features of the ear picking and conveying assembly hereinbefore described is that it embodies parts constructed and combined to provide a unitary implement assembly which can be readily attached to and removed from the tractor by one person. And in this connection, all that has to be done, assuming that the elevating conveyer assembly has already been removed (see Fig. 14) and that the power transmitting connections to shafts 35 and 55 have been severed, is to unhook link 49 from bell crank lever 67, jack or block-up the rear portion of the frame structure, and remove the pins 74 from brackets 66 whereupon the tractor can be backed away from the unitary assembly until the rear wheel remote from the front section of the assembly can be swung past the rear end of the rear section thereof and then pivot the tractor on the other rear wheel in a direction to swing the front end of the tractor away from the side positioned front section of the assembly. In order to attach the implement to the tractor, it should be obvious that the procedure to be followed is just the reverse of that above outlined and that either procedure can be readily and quickly carried out by one person.

In operating corn harvesters, it sometimes happens that crop conditions are such that a considerable quantity of loose trash, such as pieces of stalk, husks, etc., are carried rearward through trough 47 along with the picked ears. And in order to provide means for effectively removing such loose trash without interfering with or complicating the construction, operation and mounting of the ear picking and conveying means carried by the unitary implement assembly structure, a separate power driven secondary trash removing assembly is utilized comprising a housing 76 operatively mounting therein a blower 77 and a pair of parallel cooperative stalk ejecting rolls 78. Blower 77 and the rolls 78 include shaft portions 80 and 85, respectively, rotatably mounted in bearings 79 and 81, respectively, carried by side wall portions 90 and 95, respectively, of the housing. One end of the blower shaft extends beyond its supporting bearing and mounts a V-belt pulley 82 and the corresponding end of one of the rolls 78 is similarly extended and provided with a sprocket wheel 83. Housing 76 includes a bottom saddle portion 84 adapted to fit over the top outer side portion of rear axle structure 7 which in turn is provided with integral lugs or bosses 86 to which the ends of the saddle are detachably secured by means of cap screws or the like 87. The front end of housing 76 is provided with a forwardly projection duct portion 88 for directing air from blower 77 forwardly and downwardly into the rear portion of trough 47 for the purpose fully described in U. S. patent, C. J. Scranton, 2,340,084, and with a trough portion 89 adapted to receive and form a rearward extension of trough 47 effective to direct pieces of stalk upward and rearward to the rolls 78. Housing 76 is also provided with a detachably mounted pulley and sprocket wheel shield 91.

In order to readily apply power to the cooperative harvester rolls 25, to the conveying chains 26 and 52, and to the secondary trash removing assembly consisting of the blower 77 and the stalk ejecting rolls 78, the rear portion of the tractor is provided with a separate unitary power transmitting assembly comprising a rigid tubular member 92 and a sectional shaft 93. Member 92 is detachably secured to a pair of laterally spaced longitudinally extending rigid angle members 94 which are in turn secured to the top side of rear axle structure 7 by means of cap screws 96. Sectional shaft 93 is rotatably mounted in a pair of alined bearings carried by a housing structure 97 and in a third bearing carried by a bracket 98 fixedly secured to tubular member 92. Housing structure 97 is secured to tubular member 92 by means of a pair of brackets 99 and mounts therein a short shaft 101 having on its inner end a bevel gear 102 in mesh with a pinion 103 fixed to the enclosed portion of shaft 93 for rotation therewith. The outer end of shaft 101 is detachably flexibly connected with the rear end of shaft 35. The adjacent end of shaft 93 has fixed thereon a sprocket wheel 104 and a V-belt pulley 106 and the opposite end portion of this shaft is provided with a pair of sprocket wheels 107 and 108 disposed on opposite sides of the shaft bearing carried by bracket 98. Bracket 98 extends below shaft 93 and also mounts a stub shaft 109 which in turn rotatably mounts an idler sprocket wheel 111 alined with sprocket wheel 107 on shaft 93. In this connection, sprocket or first power transmitting element 108 is alined with sprocket wheel 11 on power take-off shaft 9, sprocket or power transmitting element 104 is alined with the power receiving element or sprocket 83 on lower ejecting roll 78, and pulley or power transmitting element 106 is alined with blower power receiving element or pulley 82.

Figure 4:
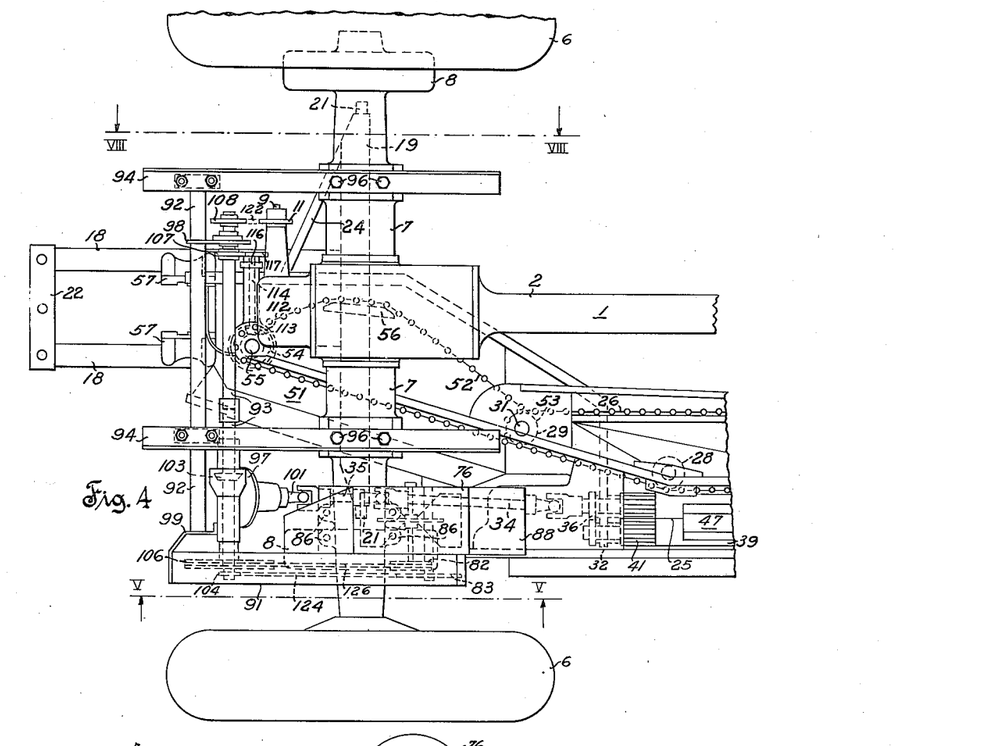
Fig. 4 is an enlarged plan view of the rear end of the structure shown in Fig. 1 with the ear elevating conveyer assembly removed.
Figure 5:
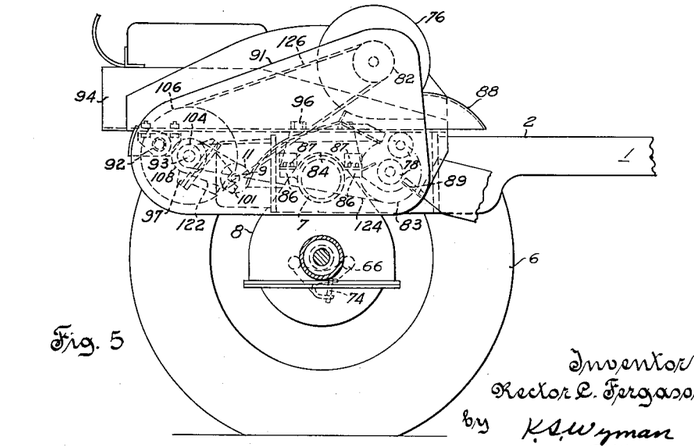
Fig. 5 is a view taken on line V—V of Fig. 4.
Figure 6:
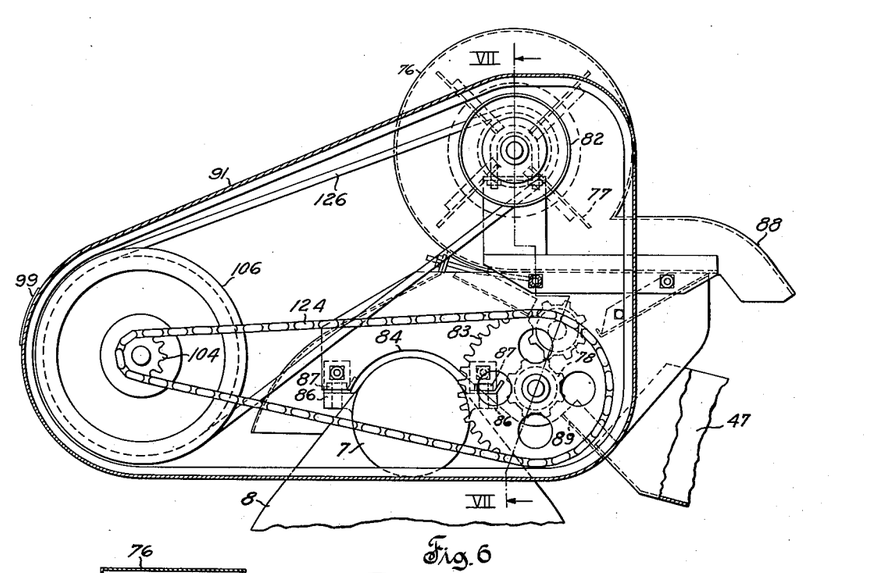
Fig. 6 is an enlarged side elevation of the trash removing assembly shown in Fig. 5.
Figure 7:
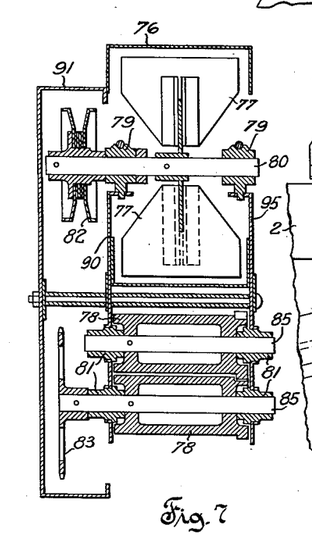
Fig. 7 is a view taken on line VII—VII of Fig. 6.
Figure 8:
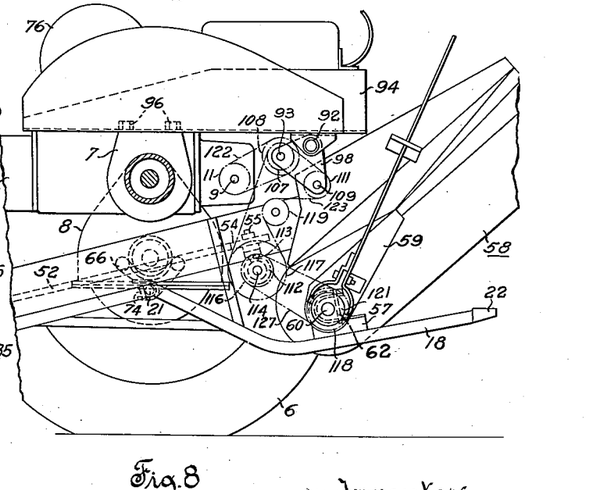
Fig. 8 is a view taken on line VIII—VIII of Fig. 4.
Figures 9, 12, 13:
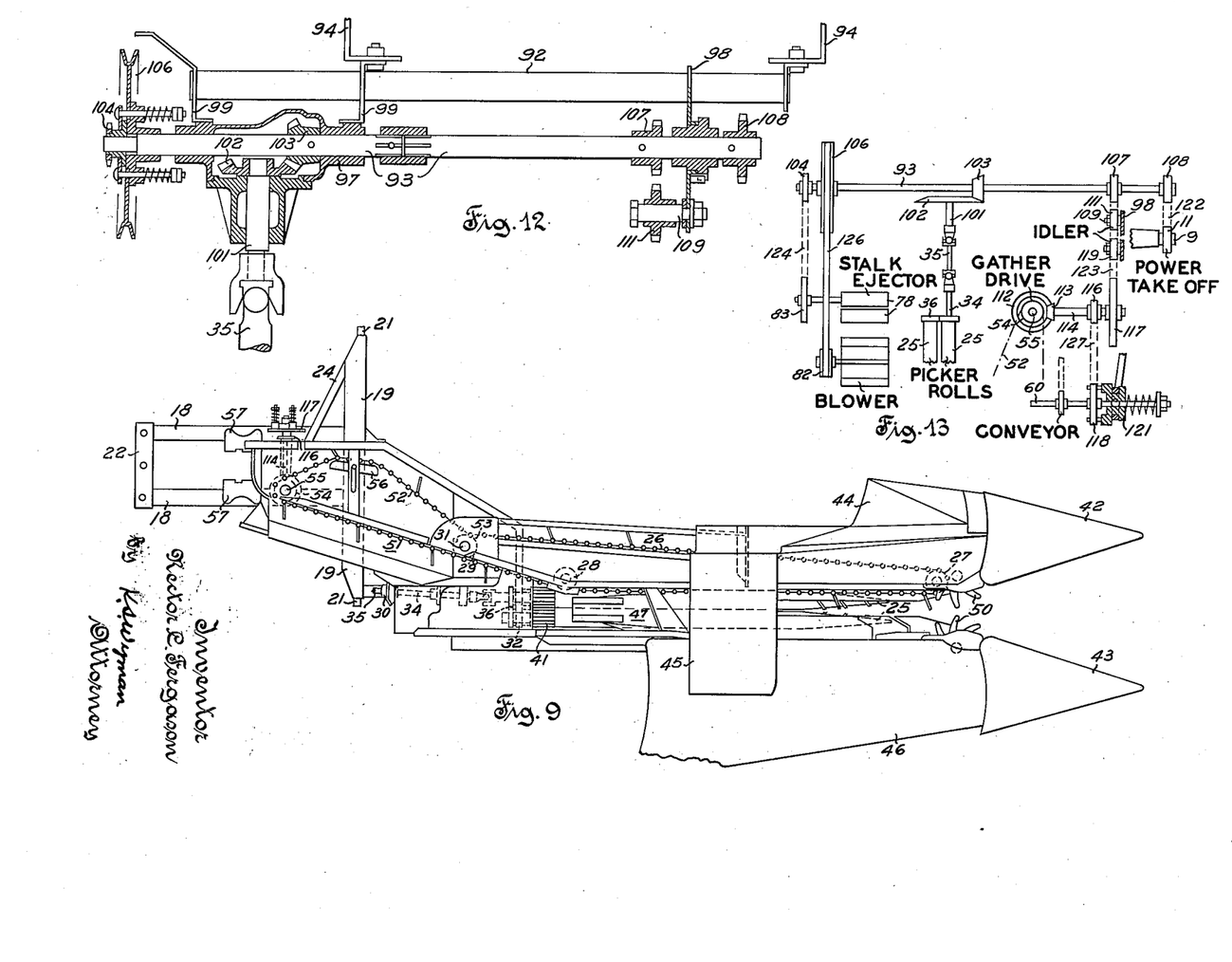
Fig. 9 is a plan view of the unitary ear picking and conveying assembly as it appears when it is detached from the tractor and rests on the ground.
Fig. 12 is a rear view of the detachably mounted power applying assembly shown in Fig. 4.
Fig. 13 is a schematic view of the harvester driving mechanism.

Referring also to Figs. 4, 8 and 13, it will be seen that the lower end of vertical shaft 55 is provided with a gear 112 in mesh with a pinion 113 carried by the inner end of a horizontal shaft 114 rotatably mounted on the rear portion of the main frame structure. The outer end of shaft 114 mounts sprockets wheels 116 and 117 of which wheel 116 is alined with a sprocket wheel 118 rotatably mounted on the outer adjacent end of elevating conveyer shaft 60. This end of conveyer shaft 60 is also provided with a conventional manually operated clutch means 121 for establishing a driving connection between sprocket wheel 118 and shaft 60. Wheel 117 is alined with sprocket wheel 107 on shaft 93, with idler sprocket 111 rotatably mounted on the stub shaft 109 carried by bracket 98, and with another idler sprocket 119 carried by the rear portion of the main frame structure.

And if it is assumed that the separate unitary assemblies or structures, i. e., the power transmitting assembly, the secondary trash removing assembly and the unitary implement assembly including the ear picking and conveying parts, the gathering shields and other parts carried by such implement assembly, have been attached to the tractor as previously described, all that has to be done in order to apply power to the various elements of such assemblies is to place a chain 122 around the power take-off sprocket 11 and first power transmitting element or sprocket 108; to place a chain 123 around additional power transmitting element or sprocket 107, idler sprockets 119 and 111, and power receiving element or sprocket 117 in the manner indicated in Fig. 8; to place a chain 124 around power receiving element or sprocket 83 and power transmitting element or sprocket 104; to place a belt 126 around power receiving element or pulley 82 and power transmitting element or pulley 106; and to connect power receiving element or shaft 35 and power transmitting element or shaft 101. In this connection, it should be noted that the position of idler sprocket 111 is such as will maintain a desired degree of tautness of chain 123 as the rear end of the main frame structure pivots on pins 21. The shield 91 enclosing pulleys 82, 106 and sprocket wheels 83, 104 may be braced, if desired by a connection with an extended portion of rear bracket 99 as shown in Fig. 4. With the various mechanisms thus mounted and operatively connected as just described, the elevating conveyer assembly 58 can be readily attached to the rear portions of the tractor and main frame structure by positioning the pivot pin portions of shaft 60 within the bracket 57 (the reach rods 63 may be first positioned in their conveyer supporting relation shown in dotted lines on Fig. 2) and inserting the securing pins 62 in brackets 57 whereupon the reach rods may be then connected to the tractor mounted brackets 64 and a chain 127 placed around sprocket wheels 116 and 118. When it is desired to remove the elevating conveyer assembly from the tractor, the procedure to be followed is just the reverse of that above described.

The power applying, the trash removing and the ear picking and conveying assemblies may be readily attached to or removed from the tractor in any desired sequence. And if desired, the elevating conveyer assembly may be attached to the tractor just as soon as the ear picking and conveying assembly is in place. In general, it is usually preferable to attach the wagon elevating conveyer assembly to the tractor after all of the other assemblies are in place. When it is desired to temporarily use a tractor, which has the above mentioned implement assemblies attached thereto as hereinbefore described, for other purposes, only the wagon elevating conveyer and the ear picking and conveying assemblies need be removed as the separate power applying and secondary trash removing assemblies are in out-of-the-way positions and in no manner interfere with normal tractor usage. However, if the power take-off 11 is to be used for driving some other device, chain 122 would, of course, be removed from sprocket wheels 11 and 108 in order to terminate operation of shaft 93 and of the trash removing assembly driven therefrom.

The intended coaction and operation of the various assemblies and elements thereof comprising the corn harvester implement herein disclosed have already been pointed out with sufficient particularity to be readily apparent to those familiar with the agricultural implement art. And inasmuch as the operation of the rolls 25 and chain 26 is substantially the same as the corresponding elements in the aforementioned Scranton patent, a further description in this connection is believed unnecessary for a complete understanding of the present invention. Moreover, it should be understood that the invention is applicable, at least in part, to implements other than corn harvesters, and that the claimed invention is not limited to the exact details of design and construction described herein, for various modifications within the scope of the appended claims will be apparent to those skilled in the art.

It is claimed and desired to secure by Letters Patent:

1. In a tractor-harvester combination, a tractor or the like having a rear axle structure supported by laterally spaced ground engaging wheels mounted on said structure adjacent opposite sides thereof and having a power take-off disposed adjacent the rear end of the tractor, a power transmitting assembly detachably mounted on said tractor to the rear of said axle structure and including a first power receiving element alined with said tractor power take-off for detachable driven connection therewith and additional power transmitting elements driven through said first element, a power actuated secondary trash removing assembly detachably mounted on the top side of said rear axle structure and having a power receiving element alined for driven connection with one of said additional power transmitting elements, a unitary harvester assembly comprising an inclined picking and primary trash removing section which extends from a point adjacent the ground upward to a height greater than the ground clearance of said rear axle structure and a conveying section disposed in stepped-down extension forming relation with respect to the elevated end of said picking and trash removing section, said inclined picking and trash removing section and said conveying section each having an independent power receiving element, and means detachably mounting said unitary harvester assembly on said tractor with each of said independent power receiving elements alined for driven connection with other ones of said additional power transmitting elements, and with the elevated discharge end of said picking and primary trash removing section positioned in trash feeding relation with respect to said secondary trash removing assembly, and disconnectable means drivingly connecting said additional power transmitting elements with said alined power receiving elements on said secondary trash removing assembly and on said unitary harvester assembly.

2. In a tractor-harvester combination, a tractor or the like having a rear axle structure supported by laterally spaced ground engaging wheels mounted on said structure adjacent opposite sides thereof and having a power take-off disposed adjacent the rear end of the tractor, a power transmitting assembly comprising a housing rotatably supporting a shaft extending therethrough and projecting laterally beyond opposite sides thereof, a second shaft rotatably mounted in said housing and projecting therefrom at a right angle to said first shaft, said shafts having housing enclosed portions thereof gear connected for power transmission therethrough, a bearing structure surrounding a portion of said first shaft remote from said housing, a power transmitting element mounted on said first shaft adjacent an end thereof, an additional power transmitting element mounted on said first shaft, and means including longitudinally spaced portions of said housing and said bearing structure detachably mounting said power transmitting assembly at the rear side of said rear axle structure to provide the same ground clearance afforded by said rear axle structure with said power transmitting element alined with said tractor power take-off for driven connection therewith, a unitary harvester assembly comprising an inclined picking and trash removing section which extends upward from a point adjacent the ground to a height greater than the ground clearance of said rear axle structure and a conveying section disposed in stepped-down extension forming relation with respect to the elevated end of said picking section, said inclined picking and conveying sections each having an independent power receiving element, and means detachably mounting said unitary harvester assembly on said tractor with the independent power receiving elements of the picking and conveying sections alined for driven connection with said second shaft and said additional power transmitting element, respectively, and disconnectable means connecting said second shaft and said additional power transmitting element with said picking and conveying sections, respectively, of said unitary harvester.

3. In a tractor-harvester combination, a tractor or the like having a rear axle structure supported by laterally spaced ground engaging wheels mounted on said structure adjacent opposite sides thereof and having a power take-off disposed adjacent the rear end of the tractor, a power transmitting assembly comprising a pair of angle members rigidly united in spaced generally parallel relation by means of a transverse tubular member fixedly connecting opposed rear end portions of said angle members, a housing attached to said tubular member and rotatably supporting a shaft extending through said housing in parallel relation to said tubular member and projecting laterally beyond opposite sides, a second shaft rotatably mounted in said housing and projecting therefrom generally at right angles to said first shaft, said shafts having housing enclosed portions thereof gear connected for power transmission therethrough, a bearing structure attached to said tubular member and surroundingly adapted to support a portion of said first shaft remote from said housing, power transmitting elements attached to opposite ends of said first shaft, an additional power transmitting element mounted on said first shaft in driven relation thereto, and means detachably fixably uniting front end portions of said angle members with laterally spaced portions of said rear axle structure, said angle members extending rearward from said axle structure in generally parallel relation to the longitudinal axis of said tractor and positioning said power transmitting unit above the ground a distance conforming with the ground clearance of said rear axle structure with one of said power transmitting elements alined with said tractor power take-off for driven connection therewith and with said second shaft extending forwardly from said housing, a power actuated secondary trash removing assembly detachably mounted on the top side of said rear axle housing and having a power receiving element alined for driven connection with the other of said power transmitting elements, a unitary harvester assembly comprising an inclined picking and primary trash removing section which extends from a point adjacent the ground upwardly to a height greater than the ground clearance of said rear axle structure and a conveying section disposed in stepped-down extension forming relation with respect to the elevated end of said picking and trash removing section, said inclined picking and trash removing section and said conveying section each having an independent power receiving element, and means detachably mounting said unitary harvester assembly on said tractor with the independent power receiving element of said picking and trash removing section alined for driven connection with said second shaft and with the independent power receiving element of said conveyer section alined for driven connection with said additional power transmitting element, and with the elevated discharge end of said picking and trash removing section positioned in trash feeding relation with respect to said secondary trash removing assembly, and disconnectable means drivingly connecting said other power transmitting element, said second shaft and said additional power transmitting element with alined power receiving elements on said secondary trash removing assembly and on said unitary harvester assembly.

4. In a corn harvester of the type adapted to be detachably pivotally mounted as a unit on a tractor or the like with an ear picking section disposed along one side of the tractor and with a picked ear conveying section extending rearward from said picking section and beneath the tractor rear axle, an elongated unitary frame structure including a front portion, a rear portion forming a laterally offset stepped-down extension of said front portion, a cross member attached to said second portion and provided with alined outwardly projecting pivot pins adapted to be connected with a pair of laterally spaced tractor mounted support elements for supporting said rear portion, and an attaching member connected to an intermediate part of said front portion and adapted to be connected with a tractor mounted support element to support said front portion, a pair of cooperative harvesting rolls and a coacting conveyer means mounted on said front portion to extend from a point adjacent the forward end thereof upward and rearward to a point adjacent the front end of said rear portion, and an ear conveyer mounted on said rear portion to extend laterally rearward away from the elevated discharge end of said rolls in stepped-down ear receiving relation thereto and to extend beneath and beyond said rear axle structure.

5. In a tractor-harvester combination, a tractor or the like having a rear axle structure supported by laterally spaced ground engaging wheels mounted on said axle structure adjacent opposite sides thereof, a corn harvester detachably mounted as a unit on said tractor with an ear picking section disposed along one side of said tractor, with a picked ear conveying section extending rearward from said picking section and beneath said rear axle structure, and including a unitary elongated frame structure comprising a front portion having a pair of longitudinally extending bar members having stepped-down rear extensions joined by a first cross member, a rear portion forming a laterally offset extension of said front portion, a second cross member attached to said rear portion and provided with alined outwardly extending pivot pins, and an attaching member connected to an intermediate section of said front section, said ear picking portion including a pair of cooperative harvesting rolls and a coacting conveyer means mounted on said front portion to extend from a point adjacent the forward end thereof to a point adjacent the forward end of said rear section, said picked ear conveying portion including an ear conveyer mounted on said second portion to extend laterally rearward from the elevated discharge end of said rolls in stepped-down material receiving relation thereto, means carried by said rear axle structure for detachably receiving the pivot pins of said second cross member for pivotally supporting the rear end of said unitary assembly beneath said rear axle structure, and means carried by an intermediate portion of said tractor for releasably connecting said attaching member for supporting the front end of said unitary assembly.

6. In a tractor-harvester combination, a tractor or the like having a rear axle structure supported by laterally spaced ground engaging wheels mounted on said axle structure adjacent oposite sides thereof, a corn harvester detachably mounted as a unitary assembly on said tractor with an ear picking section disposed along one side of said tractor and with a picked ear conveying section extending rearward from said picking section and beneath said rear axle structure, a unitary elongated frame structure comprising a front portion having a pair of longitudinally extending bars having stepped-down rear extensions united by a first cross member, a rear portion forming a laterally offset extension of said front portion and comprising an extension of one of said bars and a longitudinally extending member joined at the front end thereof to said first cross member, a second cross member attached transversely to the rear end of said laterally offset extension and provided with alined outwardly extending pivot pins adapted to support said rear portion, and an attaching member adapted to support said front portion and attached thereto, said ear picking section including a pair of cooperative harvesting rolls and a coacting conveyer means mounted on said first portion to extend from a point adjacent the forward end thereof to a point adjacent the forward end of said rear portion, said picked ear conveying section including an ear conveyer mounted on said second portion to extend laterally rearward from the elevated discharge end of said rolls in stepped-down material receiving relation thereto, and means for detachably mounting said corn harvester on said tractor including a vertically adjustable member carried by said tractor and detachably connected with said attaching member and including a support for the pivot pins of said rear portion permitting the rear end of said unitary assembly to pivot about a transverse horizontal axis as said adjustable member is moved vertically comprising parts on the underside of said axle structure detachably pivotally engaged with the pivot pins of said rear portion.

7. In a tractor-harvester combination, a tractor or the like having a rear axle structure supported by laterally spaced ground engaging wheels mounted on said axle structure adjacent opposite sides thereof, a corn harvester detachably mounted as a unitary assembly on said tractor with an ear picking section disposed along one side of said tractor and with a picked ear conveying section extending rearward from said picking section and beneath said rear axle structure, a unitary elongated frame structure comprising a front portion including a pair of longitudinally extending bars having a stepped-down portion therein terminating at the rear end of one of said bars, said stepped-down portion being attached at the rear end thereof to a first cross member, a rear portion forming a laterally offset extension of said front portion and including an extension of the other one of said bars and a longitudinally extending member attached at the upper end thereof to said first cross member and extending substantially parallel to said extension bar, a second cross member attached to the rear ends of said extension bar and said longitudinally extending member and provided with alined outwardly extending pivot pins adapted to support said rear portion, and an attaching member connected to said front portion at an intermediate point thereof between said pivot pins and adapted to support said front portion, said ear picking section including a pair of cooperative harvesting rolls and a coacting conveyer means mounted on said front portion to extend from a point adjacent the forward end thereof to a point adjacent the forward end of said rear portion, said picked ear conveying section including an ear conveyer mounted on said second portion to extend laterally rearward from the elevated discharge end of said rolls in stepped-down picked ear receiving relation thereto, and means for detachably mounting said corn harvester on said tractor including a vertically adjustable member carried by said tractor and detachably connected with said attaching member and including laterally spaced parts carried by said rear axle structure in underslung relation thereto, said parts detachably receiving and supporting said pivot pins and thereby the rear of said unitary assembly for pivotal movement about a transverse horizontal axis parallel to and adjacent the axis of rotation of said ground engaging wheels.

8. In a tractor-agricultural implement combination, a tricycle type tractor or the like having a rear axle structure supported by transversely spaced ground engaging wheels mounted on said structure adjacent opposite sides thereof and having a dirigible front wheel support, a unitary implement assembly comprising an inclined first section extending rearwardly upward to a height greater than the ground clearance afforded by said rear axle structure and a second section disposed in stepped-down transversely offset extension forming relation with respect to the rear end of said first section, and means including releasably connected parts detachably mounting said unitary assembly on said tractor with said first section positioned to extend from a point near the ground adjacent said dirigible wheel rearward and upward along one side of said tractor in proximate relation thereto to a point laterally closely adjacent to one of said ground engaging wheels, and with said second section extending rearward beneath and beyond said axle structure in the space between said wheels, said second section including a rigid cross member disposed in adjacent and generally parallel relation to the axis of rotation of said ground engaging wheels, said cross member being generally transversely coextensive with said rear axle structure.

9. In a tractor-agricultural implement combination, a tricycle type tractor having a rear axle structure supported by transversely spaced ground engaging wheels mounted on said structure adjacent opposite sides thereof and having a dirigible front wheel support, a unitary implement assembly comprising an inclined first section extending rearwardly upward to a height greater than the ground clearance afforded by said rear axle structure and a second section disposed in stepped-down transversely offset extension forming relation with respect to the rear end of said first section, and means including releasably connected parts affording front and rear supports detachably mounting said unitary assembly on said tractor with said first section positioned to extend from a point near the ground adjacent said dirigible wheel rearward and upward along one side of said tractor in proximate relation thereto to a point laterally closely adjacent to one of said ground engaging wheels, and with said second section extending rearward beneath and beyond said axle structure in the space between said ground engaging wheels, said second section including a rigid cross member disposed in adjacent and generally parallel relation to the axis of rotation of said ground engaging wheels, said cross member presenting end portions terminating in oppositely facing trunnion portions spaced transversely substantial distances from the longitudinal axis of said tractor, said trunnion portions coacting with said releasable parts to provide transversely aligned rear pivot supports for said unitary assembly.

RECTOR C. FERGASON.

REFERENCES CITED

The following references are of record in the file of this patent:

UNITED STATES PATENTS

| Number | Name | Date |
|---|---|---|
| 1,340,461 | Ronning et al. | May 18, 1920 |
| 2,293,757 | Jochumsen | Aug. 25, 1942 |
| 2,340,084 | Scranton | Jan. 25, 1944 |
| 2,389,478 | Aasland | Nov. 20, 1945 |
| 2,444,561 | Fergason | July 6, 1948 |